United States Patent
Malina et al.

[15] 3,638,220
[45] Jan. 25, 1972

[54] FORCE-BALANCING MEANS FOR A LINEAR TAPE TRANSDUCER

[72] Inventors: Jay T. Malina; Mitchell Tress, both of Miami Beach, Fla.

[73] Assignee: Anilam Electronics Corporation, Hialeah, Fla.

[22] Filed: Sept. 15, 1969

[21] Appl. No.: 858,003

[52] U.S. Cl. ..........................340/347 AD, 33/129, 267/156
[51] Int. Cl. ......................................................H03k 13/02
[58] Field of Search ................340/347; 33/1, 129, 137, 138, 33/139; 267/156

[56] References Cited

UNITED STATES PATENTS

| | | | |
|---|---|---|---|
| 3,526,890 | 9/1970 | Malina et al. | 340/347 |
| 3,436,954 | 4/1969 | Eppler | 33/129 |
| 2,996,264 | 8/1961 | Bygdnes | 267/156 |
| 2,609,191 | 9/1952 | Foster | 267/156 |

Primary Examiner—Maynard R. Wilbur
Assistant Examiner—Jeremiah Glassman
Attorney—Meyer A. Baskin

[57] ABSTRACT

This invention pertains to a linear tape transducer including a force-balancing means to balance the forces on a measuring roller, carried by a pulse generator, having a spring-tempered measuring tape partially wrapped around said measuring wheel. The linear tap transducer includes a retractable-type of spring-tempered measuring tape and converts the mechanical movement of a movable member of a machine tool into electric pulses which are, in turn, converted into numbers, illuminated on a display unit for visual observation by the operator, to indicate the amount of movement of said movable member. The force balancing means consists generally of a pair of guide rollers for the measuring tape with the measuring roller disposed therebetween. The result of the force balancing being to achieve a minimum resultant force on the axis of the measuring pulse generator.

One of the guide rollers is adjustable whereby the path of the measuring tape may be varied as it passes partially around each of the guide rollers and the measuring roller to compensate for minute variations in the mounting of the various components.

13 Claims, 13 Drawing Figures

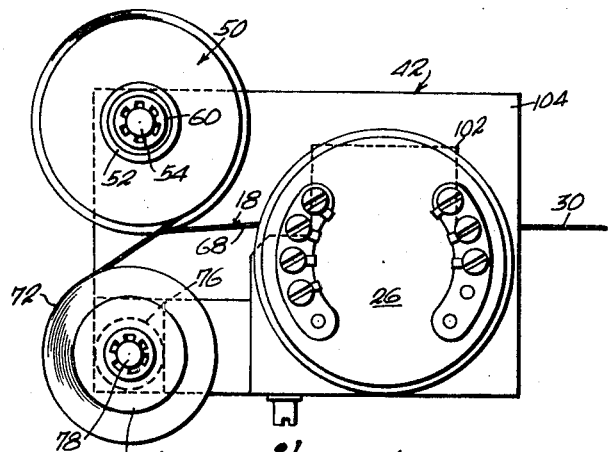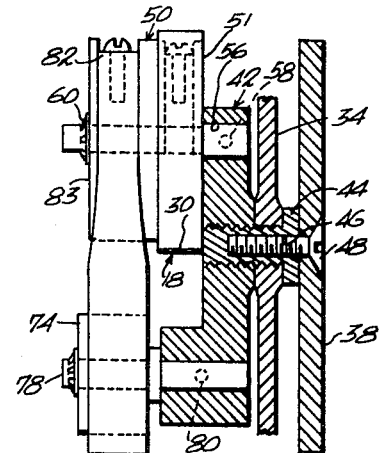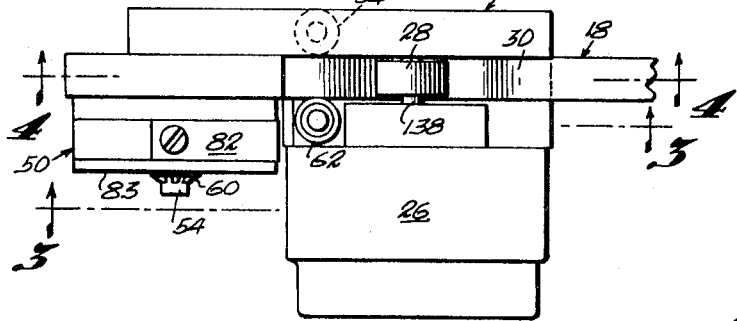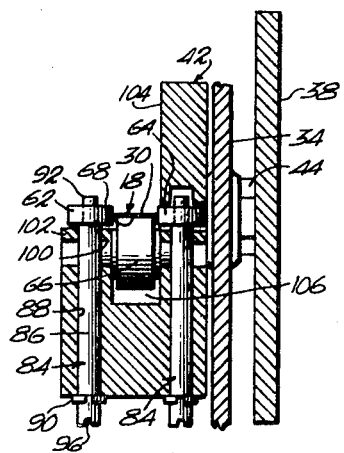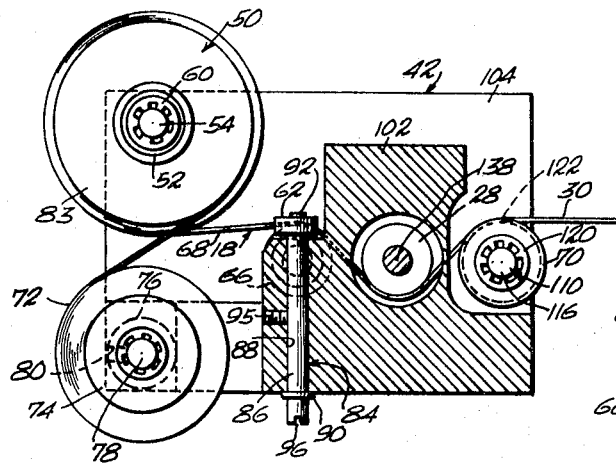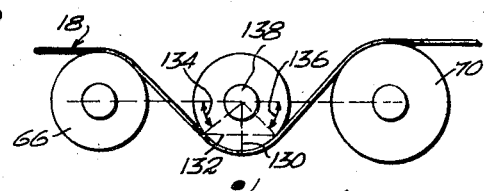
INVENTORS.
JAY T. MALINA
MITCHELL TRESS
ATTORNEY

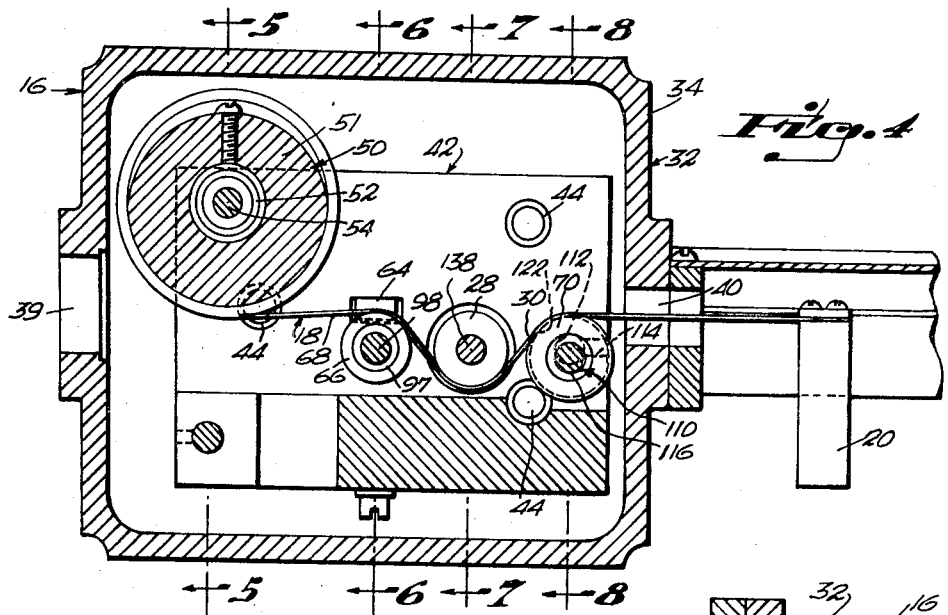
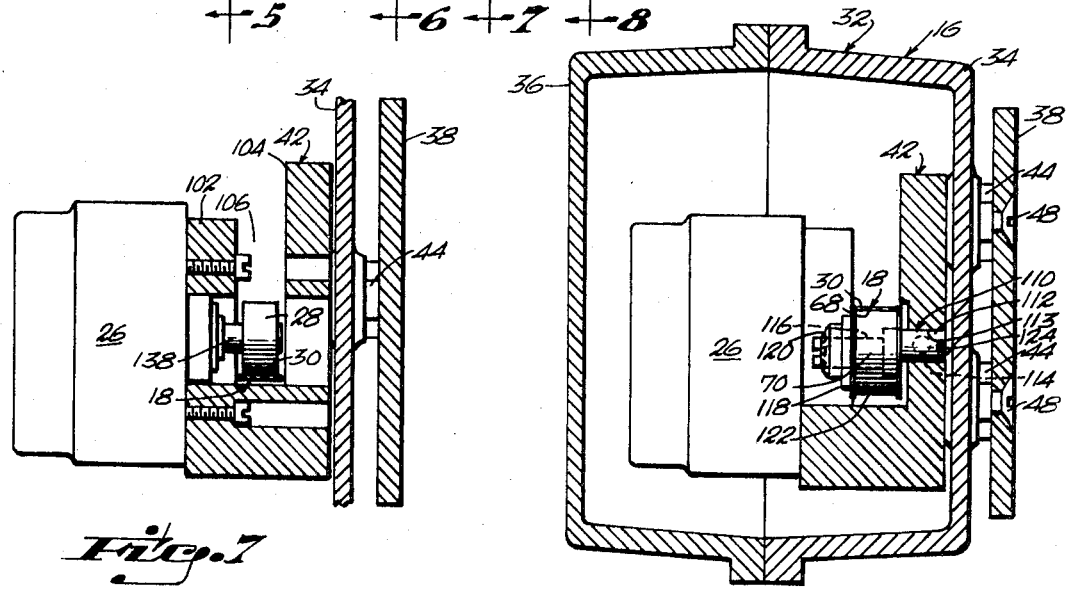
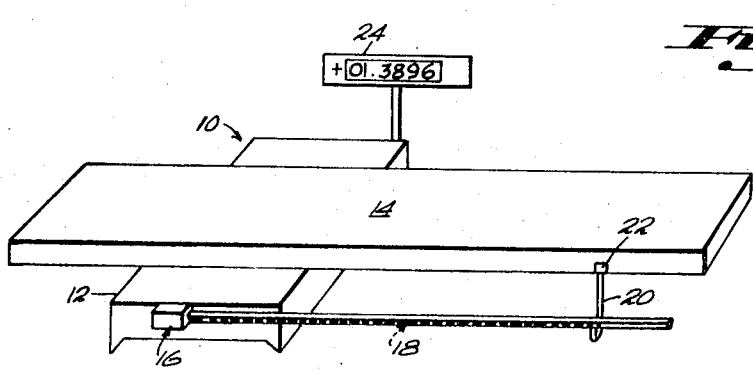

PATENTED JAN 25 1972 3,638,220

INVENTORS.
JAY T. MALINA
MITCHELL TRESS

BY Meyer G. Baskin
ATTORNEY.

FORCE-BALANCING MEANS FOR A LINEAR TAPE TRANSDUCER

This invention pertains to a linear tape transducer to be used in combination with a conventional digital readout system for machine tools and is an improvement on the linear tape transducer disclosed in copending application, filed Aug. 8, 1968, Ser. No. 751,201 and entitled "Linear Tape Transducer," now U.S. Pat. No. 3,526,890.

One of the principal problems with linear tape transducers of this type has been to provide a consistent accuracy and repeatability in the measurements of the work being produced by a machine tool as determined by numbers appearing to the operator on an illuminated display unit. It can be readily appreciated that very minute discrepancies or variations in the mounting of the measuring means, which results in the members appearing on the visual display unit as the work progresses, can cause unnatural forces on the measuring means and a resulting inaccuracy in the numbers appearing on the display unit when these measurements are carried to one thousanths of an inch or less.

The present invention incorporates some of the structural elements disclosed in the above-mentioned copending application such as a reel-wound measuring tape employing a negator-type rewind spring, and the general relationship between a measuring roller, operating a pulse generator, and the movement of a movable portion of a machine tool, having the extended ends of the measuring tape fixed thereto, and the stationary base portion thereof, having the linear tape transducer affixed thereto. When the movable portion of the machine tool is moving in either direction, the measuring tape is either extended from or retracted by the linear tape transducer and the measuring roller which is in contact with the tape is rotated in a direction and amount consistent with the movement of the movable portion of the machine tool, thus providing a plus or minus reading on the display unit in the conventional manner.

One of the principal objects of the present invention is to provide a guide means for the spring-tempered measuring tape, the guide means being provided with a limited degree of universal adjustment whereby the path of travel of the measuring tape, from the measuring roller to the point of attachment to the movable part of the machine tool, may be varied.

Another object of the present invention is to provide a guide roller, adjacent the measuring roller, which is adjustable to vary the longitudinal and vertical relationship between the axes of the guide roller and the measuring roller as well as their transverse relationship to provide a force balancing means there between and a resulting consistent accuracy between the dimensions of work being produced and readings appearing on the visual display unit.

Yet another object of the present invention is to provide an annular recess in the annular face of the adjustable guide roller which is of a depth substantially equal to the thickness of the spring-tempered measuring tape and of a width to snugly yet freely receive said tape whereby transverse adjustment of the guide roller will move the tape from a natural to a forced path of travel.

Eccentric mounting means are also provided for the adjustable guide roller whereby the longitudinal and vertical spacing relationship between the measuring roller and said guide roller can be varied. As the spring-tempered measuring tape passes down and around the underside of the measuring roller and then up and over the adjustable guide roller, any unnatural forces existing between the measuring roller and the spring-tempered measuring tape can be balanced by changing the path of said measuring tape by adjusting said path by means of the eccentric or transverse adjustments of the guide roller.

A still further object of the present invention is to provide a simple and accurate means of balancing the forces on the measuring roller which is carried directly by the pulse generator shaft thus eliminating the necessity of isolating the pulse generator and providing a gear drive from the measuring roller to the pulse generator.

Other objects and advantages of the present invention will become more fully apparent to those skilled in the art form the following detailed description when read in conjunction with the accompanying drawings in which;

FIG. 1 is a front elevational view of the improved linear tape transducer of the present invention removed from the housing;

FIG. 2 is a top plan view of FIG. 1;

FIG. 3 is a longitudinal sectional view taken along the line 3—3 of FIG. 2;

FIG. 4 is a longitudinal sectional view taken along the line 4—4 of FIG. 2;

FIG. 5 is a vertical cross-sectional view taken along the line 5—5 of FIG. 4;

FIG. 6 is a vertical cross-sectional view taken along the line 6—6 of FIG. 4;

FIG. 7 is a vertical cross-sectional view taken along the line 7—7 of FIG. 4;

FIG. 8 is a vertical cross-sectional view taken along the line 8—8 of FIG. 4;

FIG. 9 is a schematic illustration of a machine tool incorporating the linear tape transducer of the present invention.

FIG. 10 is a force diagram illustrating the manner in which the force-balancing means of the present invention is effective in providing a high degree of accuracy in an electronic measuring system as applied to a machine tool or the like;

Figures 11, 12:
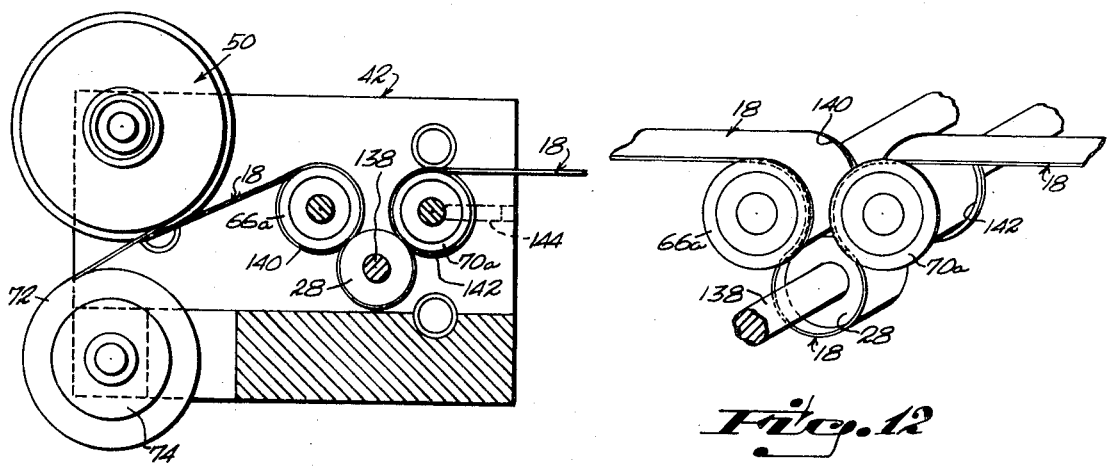
FIG. 11 is a longitudinal sectional view, somewhat similar to FIG. 4, illustrating a modified form of the present invention.
FIG. 12 is a perspective view of various components of FIG. 11.

With reference to the drawings, in which like reference numerals designate like or similar parts throughout the various views, and particularly to FIG. 9, the numeral 10 generally indicates a schematic illustration of a machine tool having a stationary portion 12 and a portion 14 which is movable relative thereto. Fixed to the stationary portion 14 is a linear tape transducer 16, in accordance with the present invention, having a spring-tempered measuring tape 18, extending outwardly from one end thereof, which is attached at its outer distal end to a generally downwardly extending finger 20 fixed as at 22 to the movable portion 14. In this manner, the tape 18 is withdrawn from or retracted by the transducer 16 in direct proportion to the amount and direction of movement of the movable portion 14 in a manner to be described hereinafter.

A conventional digital readout display unit 24 visually indicates the amount and direction of movement and is fixed in an convenient location on the stationary portion 12 of the machine.

While the electronic digital readout system forms no part of the present invention, it is important to note that this device visually records movements of one thousanths of an inch or less of the movable portion 14, the accuracy of this visual recording is dependent on the accuracy of the linear tape transducer from which it receives signals in the form of electric pulses transmitted thereto from a pulse generator 26. The signals are transmitted to the readout display unit 24 in direct proportion to the amount and direction of tape movement, which movement is imparted to the pulse generator 26 by a measuring roller 28 in rolling contact with one longitudinal face 30 of the tape 18.

With reference to FIGS. 6 and 8, the linear tape transducer 16 includes a housing enclosure 32, composed of two portions 34 and 36. The portion 34 being fixed to an appropriate bracket means 38 which is in turn fixed to the stationary portion 12 of the machine tool. The housing includes an electric conduit opening 39 at one end and an opening 40 at the other end to provide a passage therethrough of the extended portion of the measuring tape 18.

A main support bracket 42 is fixed interiorly on the housing portion 34 by a plurality of screws 44 threaded therethrough as best seen in FIG. 5, the screws 44 being interiorly screw threaded as at 46 for the reception of screws 48 threaded through the attachment bracket 38.

The main support bracket 42 carries a spool 50 rotatably journaled as at 52 on a stub shaft 54 fixed in an aperture 56 by means of a setscrew 58, the spool 50 being held on the shaft 54 by a spring washer 60. With reference to FIGS. 1, 3, 4 and 5, the main length of the measuring tape 18 is normally convolutely wound on the inner portion 51 of the spool 50, emerging therefrom at the bottom, see FIG. 4, and passing between a pair of opposed side edge guide rollers 62 and 64, see FIG. 6, and over a guide roller 66 which is in rolling contact with the bottom longitudinal face 68 of the measuring tape 18. From the roller 66, the tape passes downwardly and around the lower portion of the measuring roller 28 which is in rolling contact with the upper longitudinal face 30 of the tape 18 and then upwardly and over an adjustable guide roller 70 and outwardly through the opening 40 for attachment of the outer distal end thereof to the movable portion of the machine tool in the manner previously described.

As shown in FIGS. 1, 3 and 5 a spring 72 is convolutely wound on a second spool 74, journaled as at 76 on a stub shaft 78 fixed in the main support bracket 42 by means of a setscrew 80. The spool 72 is spaced from the measuring tape spool 50 and the spring 72 is of a type known in the trade as a NEGATOR spring which exerts a constant tension regardless of the extent to which it is unwound. This being in contrast to the ordinary convolutely wound tension spring which exerts a constantly decreasing tension as it is being unwound.

The outer distal end 82 of the NEGATOR spring is fixed to the outer portion 83 of the measuring tape spool 50 in a manner so as to be unwound from the spool 74 and wound convolutely on the measuring tape spool 50 as the measuring tape 18 is being unwound, thereby exerting a constant tension on the measuring tape spool 50, tending to rewind said measuring tape. Consequently, the measuring tape 18 is under a constant tension regardless of the amount of tape 18 that is unwound from the spool 50.

The side edge guide rollers 62 and 64 and the guide roller 66 serve to provide a consistent path of travel for the measuring tape as it is being withdrawn from or retracted onto the spool 50. The pair of side edge guide rollers 62 and 64 are adjustably mounted on respective eccentric shafts 84, each of which comprises an elongate body portion 86 mounted in an appropriate vertical bore 88 in the main support bracket 42, and is held in place by a split ring 90 adjacent its lower end. The upper end of each shaft is provided with a reduced diameter portion 92 which is eccentric relative to the body portion 86 and carries one of the side edge guide rollers 62 or 64 journaled as at 94 thereon. Each shaft 84 is further provided with a setscrew 95 and a slot 96 at the lower end for the reception of an appropriate tool for rotating the main body portion 86 whereby the eccentric portion 92 carrying a guide roller 62 or 64 may be rotated to adjust said guide roller relative to the respective edge of the measuring tape 18. Therefore when both of the side edge guide rollers are adjusted to engage respective opposed side edges of the tape 18 as it passes over the guide roller 66, the tape is confined to a consistent path of travel.

The guide roller 66 is rotatably journaled as at 97 on a cross-shaft 98 in a substantially common vertical plane with the guide rollers 62 and 64. The cross-shaft 98 is mounted in a bore 100 passing through vertical sidewall portions 102 and 104, of the mounting bracket 42, which form a central longitudinal recess 106 therebetween for passage of the measuring tape 18 over the guide roller 66, under the measuring roller 28 and over the adjustable guide roller 70 as previously described.

With reference to FIGS. 4 and 8, the adjustable guide roller 70 is mounted on a horizontal eccentric shaft 110 which is composed of a mounting portion 112 which is held in a bore 113 in main mounting bracket 42 by a setscrew 114, and an eccentric portion 116 which carries the roller 70 on a suitable bearing 118, a spring washer 120 being utilized to hold the guide roller 70 on the eccentric portion 116. The adjustable guide roller 70 is provided with an annular recess 122 in its annular face which is of a depth substantially equal or slightly greater than the thickness of the spring-tempered measuring tape 18 and of a width to snugly yet freely guide the measuring tape 18 as it is being withdrawn or retracted in the manner previously described.

The mounting portion 112 is provided with a cross slot 124 for engagement by a suitable tool whereby the eccentric portion 116 carrying the guide roller 70 may be rotated about the axis of the mounting portion 112 to vary the longitudinal and vertical relationship between the axes of the guide roller 70 and the measuring roller 28. Additionally, the transverse relationship between the annular recess 122 in the guide roller 70 and the measuring roller 28 may be adjusted by moving the mounting portion 112 inwardly or outwardly in the bore 113 to move the spring-tempered measuring tape 18 into either a natural or forced path of travel as required. In this manner a limited amount of universal adjustment of the guide roller 70 relative to the measuring roller is provided whereby the forces on the measuring roller 28 may be accurately balanced to provide consistent accuracy in the actual measurements of work being performed by a machine tool relative to the measurements appearing on the readout display unit 24.

It has been determined by experimentation that a degree of accuracy ranging to one thousandth of an inch or less is difficult to maintain on a consistent basis due to very minute variations in the mounting of the various components particularly, measuring roller 28 and pulse generator 26, and that by providing the limited amount of universal adjustment of the guide roller 70, the unnatural forces created on the measuring tape by these minute variations can be balanced to provide the desired consistent accuracy without resorting to gear drives between the measuring roller and the pulse generator.

The spring-tempered tape 18 which may be made of stainless steel, by way of example, must have a high enough spring constant to exert a normal force, inducing a frictional force for coupling the tape to the measuring roller 28, adequate to prevent slippage when the tape travel is subject to high positive and negative accelerations. Increasing the thickness of the tape 18 increases the spring constant but wrapping of the tape 18 partially around the measuring roller highly stresses the tape. Unless the tape is sufficiently thin, the stresses of the partial wrapping around will exceed the yield strength of the tape causing permanent deformation with resulting measuring inaccuracies and eventual metal fatigue resulting in tape failure.

By wrapping the tape partially around the measuring roller 28, the normal forces inducing the required frictional forces are applied normally to the roller circumference. With reference to FIG. 10, the normal forces can be broken down into vertical and horizontal components 130 and 132 respectively. In a mechanically symmetrically system as illustrated wherein the angles of tangency 134 and 136 of the tape 18 to the measuring roller 28 are equal, the horizontal forces are balanced and equal zero and only the vertical segment of the normal force is transmitted to the shaft 138 of the pulse generator 26, thus reducing the torque loading on the sensitive pulse generator housing 50 and measuring system alignment. As previously described the limited degree of universal adjustment of the guide roller 70 compensates for any slight inaccuracies in the mounting of the pulse generator to maintain the balanced condition of the horizontal forces.

Figure 13:
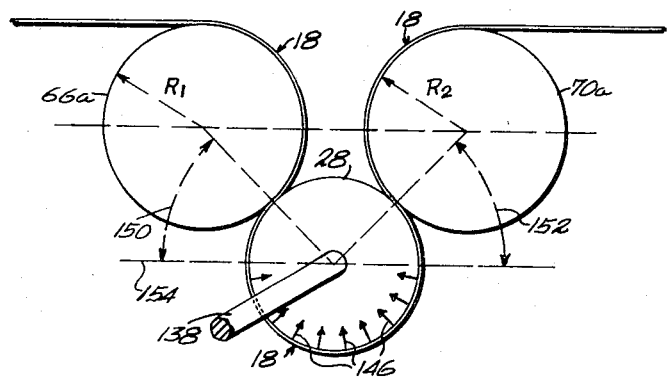
FIG. 13 is a force diagram of the modified form, similar to FIG. 10.

With reference to FIGS. 11, 12, and 13, a modified form of the present invention is illustrated in which the measuring tape 18 passes over a guide roller 66a, downwardly and partially around the measuring roller 28, upwardly and partially around an adjustable guide roller 70a and then horizontally outwardly for attachment to a movable portion of a machine tool in the same manner as described with reference to the first form of the invention.

However, both guide rollers 66a and 70a are in contact with the measuring roller 28 through the thickness of the measuring tape 18 in a manner so as to balance the normal forces on the circumference of the measuring roller 28 caused by the partial wrapping of the measuring tape therearound. In this manner, substantially all horizontal and vertical forces are cancelled out, in a mechanically symmetrical system as illustrated, providing a substantially zero force on the pulse generator shaft 138 and eliminating substantially all force transmissions to the pulse generator housing 50.

As illustrated in FIGS. 11, 12 and 13 both guide rollers 66a and 70a are provided with annular recesses 140 and 142 respectively to provide for positive tracking of the tape 18 through the measuring system and the adjustable roller 70a is provided with a setscrew 144 for transverse adjustment thereof in the same manner and for the same purpose as roller 70. However, the eccentric adjustment as provided on roller 70 is omitted on roller 70a. The measuring roller 28 is somewhat narrower than the width of the measuring tape 18, therefore will cooperate with rollers 66a and 70a by fitting into recesses 140 and 142 and pressing tape 18 between said rollers.

Referring to the force diagram FIG. 13, the normal forces inducing the required frictional forces applied to the measuring roller circumference are indicated by the force arrows 146. It has been mathematically calculated that both the horizontal and vertical forces on the pulse generator shaft are substantially zero in a mechanically symmetrical system wherein the radius R1 and R2 of the guide roller 66a and 70a respectively are equal and the angles 150 and 152 from the axis of the measuring roller 28 through the respective axis of the guide rollers 66a and 70a are equal.

The angles 150 and 152 may be any equal angles formed between lines extending from the measuring roller axis through the respective axis of the guide rollers 66a and 70a, and a diametric line 154 passing through the measuring roller 28, angles 150 and 152 being in opposed relation to a 180° segment of the measuring roller having the measuring tape wrapped therearound. Angles 150 and 152 are preferably approximately 45°.

We claim:

1. For use in accurately measuring the amount of linear movement of a movable member relative to a stationary member as in a machine tool, a linear tape transducer, for use with an electronic measuring system, which converts electric pulses into numbers illuminated on a display unit for visual observation by the operator; the improvement residing in a force balancing means for the linear tape transducer, comprising:
   A. a main mounting bracket fixed to said stationary member;
   B. a retractable spring-tempered measuring tape means convolutely carried on a spool which is rotatably fixed to said mounting bracket and having an extendable end attached to said movable member for movement therewith;
   C. first and second spaced-apart guide rollers rotatably journaled on said mounting bracket between said spool and extendable end;
   D. a pulse generator means including a measuring roller mounted on said mounting bracket, said measuring roller being positioned between said first and second guide rollers, and said spring-tempered measuring tape means being deflected from a constant plane of travel between said spool and said extendable end, by being wrapped partially around each of said guide rollers and partially around said measuring roller in a manner as to provide substantial frictional contact with all of said rollers;
   E. at least one of said guide rollers including adjustment means to provide for a predetermined symmetrical relationship between said measuring roller, guide rollers and the area of contact of said tape with each of said guide rollers, whereby the forces created by the spring-tempered measuring tape being partially wrapped around said measuring roller are balanced as to their horizontal components thus reducing the load on the axis of said measuring roller.

2. A force-balancing means for a linear tape transducer as set forth in claim 1 in which said adjustment means comprises an adjustable eccentric mounting shaft for said second guide roller whereby the longitudinal and vertical relationship between the axes of said second guide roller and measuring roller may be varied.

3. A force-balancing means for a linear tape transducer as set forth in claim 2 in which said second guide roller is provided with an annular recess, of a depth substantially equal to the thickness of said measuring tape, to provide tracking means for defining a positive path of travel for said measuring tape, said eccentric mounting shaft including transverse adjustment means whereby said path of travel may be varied from a natural path to a forced path;

4. A force-balancing means for a linear tape transducer as set forth in claim 3 in which said transverse adjustment means includes a mounting hole in said main mounting bracket for the slidable reception of said eccentric mounting shaft and a setscrew means for holding said eccentric mounting shaft in a predetermined transverse position.

5. A force-balancing means for a linear tape transducer as set forth in claim 4 in which the axes of said first and second guide rollers and said measuring roller are coplanar.

6. A force-balancing means for a linear tape transducer as set forth in claim 1 in which said first guide roller is positioned between said spool and said measuring roller and said second guide roller is positioned between said measuring roller and the point of attachment of said extendable end, said measuring tape being made of spring-tempered material and being threaded partially around each of said first and second guide rollers and said measuring rollers in a manner so as to pass between each of said guide rollers and said measuring roller, the distance between the axis of said measuring roller and the respective axes of each of said guide rollers being such that a contact is provided between each of said guide rollers and said measuring roller through the thickness of said measuring tape.

7. A force-balancing means for a linear tape transducer as set forth in claim 6 in which the distance between said points of contact of each of said first and second guide rollers is less than the diameter of said measuring roller.

8. A force-balancing means for a linear tape transducer as set forth in claim 7 in which said first and second guide rollers are symmetrically mounted with respect to the measuring roller so as to form equal angles between a diametric line through said measuring roller which is parallel to a line passing through the axes of said first and second guide rollers and respective lines from the axis of said measuring roller to the axes of each of said first and second guide rollers.

9. A force-balancing means for a linear tape transducer as set forth in claim 8 in which said equal angles are substantially 45°.

10. A force-balancing means for a linear tape transducer as set forth in claim 8 in which said equal are in opposed relation, relative to said diametric line, to a 180° segment of said measuring roller having the measuring tape wrapped therearound.

11. A force-balancing means for a linear tape transducer as set forth in claim 6 including annular recesses in each of said guide rollers, of a depth substantially equal to the thickness of said measuring tape, to provide tracking means for defining a positive path of travel for said measuring tape.

12. A force-balancing means for a linear tape transducer as set forth in claim 11 in which said adjustment means includes a hole in said main mounting bracket, a mounting shaft for said second guide roller slidably received in said hole and a setscrew means for holding said mounting shaft in a predetermined position in said hole to provide transverse adjustment of said second guide roller whereby said path of travel may be varied from a natural path to a forced path.

13. A force-balancing means for a linear tape transducer as set forth in claim 12 in which the width of said measuring roller is smaller than the width of said recesses and measuring tape.

* * * * *